United States Patent
Baum et al.

(10) Patent No.: US 8,966,961 B2
(45) Date of Patent: Mar. 3, 2015

(54) MOMENT MEASURING DEVICE CONTAINING A GRAVITY-CENTER-NEUTRAL ECCENTRIC

(75) Inventors: Christian Baum, Berlin (DE); Ronny Jahnke, Falkensee (DE)

(73) Assignee: Siemens Aktiengesellschaft, Munich (DE)

(*) Notice: Subject to any disclaimer, the term of this patent is extended or adjusted under 35 U.S.C. 154(b) by 478 days.

(21) Appl. No.: 13/270,266

(22) Filed: Oct. 11, 2011

(65) Prior Publication Data
US 2012/0085153 A1    Apr. 12, 2012

(30) Foreign Application Priority Data
Oct. 12, 2010   (EP) ..................................... 10187255

(51) Int. Cl.
G01M 1/00       (2006.01)
G01M 1/10       (2006.01)
G01M 1/26       (2006.01)

(52) U.S. Cl.
CPC .. G01M 1/10 (2013.01); G01M 1/26 (2013.01)
USPC ............................... 73/65.01; 73/456; 73/859

(58) Field of Classification Search
CPC ....... F16D 1/0817; B23Q 3/063; G01M 1/10; G01M 1/14; G01M 1/26
USPC .......................................... 73/65.01, 856, 859
See application file for complete search history.

(56) References Cited

U.S. PATENT DOCUMENTS

| | | | |
|---|---|---|---|
| 4,265,023 A | 5/1981 | Bogdan | |
| 5,246,322 A * | 9/1993 | Salice | 411/15 |
| 6,675,674 B2 * | 1/2004 | Wang | 74/531 |
| 7,328,496 B2 * | 2/2008 | Powers et al. | 29/559 |
| 7,891,227 B2 * | 2/2011 | Moeck et al. | 72/422 |
| 8,256,843 B2 * | 9/2012 | Iguchi | 297/367 P |
| 2003/0213330 A1 | 11/2003 | Wang | |
| 2005/0091846 A1 | 5/2005 | Dorrel | |

FOREIGN PATENT DOCUMENTS

| | | |
|---|---|---|
| CN | 1607319 A | 4/2005 |
| DE | 20208233 U1 | 8/2002 |
| EP | 0524412 A2 | 1/1993 |

* cited by examiner

Primary Examiner — Lisa Caputo
Assistant Examiner — Roger Hernandez-Prewit

(57) ABSTRACT

A gravity center neutral eccentric is provided. The gravity-center-neutral eccentric includes an axis of rotation and an eccentric region, wherein the center of mass of the eccentric lies on the axis of rotation. In another embodiment, a center of mass of the eccentric region also lies on the axis of rotation. A measurement device including a gravity center neutral eccentric is also provided.

6 Claims, 3 Drawing Sheets

MOMENT MEASURING DEVICE CONTAINING A GRAVITY-CENTER-NEUTRAL ECCENTRIC

CROSS REFERENCE TO RELATED APPLICATIONS

This application claims priority of European Patent Office application No. 10187255.4 EP filed Oct. 12, 2010, which is incorporated by reference herein in its entirety.

FIELD OF INVENTION

The invention relates to a gravity-center-neutral eccentric and to a measurement device having a gravity-center-neutral eccentric.

BACKGROUND OF INVENTION

When determining moment weights for example of turbine or compressor blades, the blades to be weighed must be fixed and centered exactly and reproducibly on a moment weighing system by means of a measurement device.

An eccentric is often used for fixing the measurement object. The change in center of gravity which occurs with the clamping influences the measurement result, and is disregarded.

SUMMARY OF INVENTION

It is an object of the invention to improve the moment measurement of measurement objects.

Said object is achieved according to the invention by means of the features of the claims.

According to a first aspect of the invention, a gravity-center-neutral eccentric comprises an axis of rotation and an eccentric region, wherein the center of mass of the eccentric lies on the axis of rotation. Said eccentric is symmetrical with respect to the center of mass, that is to say said eccentric has the same center of mass in all rotational positions thereof. Therefore, a rotation of the eccentric about its longitudinal axis or axis of rotation, such as is carried out during the clamping of the measurement object, is of no significance during the moment measurement for example on a moment weighing system. In this way, a reliable and reproducible measurement is obtained which is independent of the position of the eccentric.

In particular, the center of mass of the eccentric region lies on the axis of rotation, such that the centering of the center of mass on the axis of rotation is realized directly in the eccentric region. The center of mass therefore lies centrally in the axial direction, which permits better handling of the eccentric.

The eccentric region may be point-symmetrical with respect to the axis of rotation. In this way, it can be achieved that the center of mass lies on the axis of rotation. The point-symmetry makes it possible for a geometry, which acts on the measurement object, of the eccentric region to be arranged distributed manifold, for example fourfold, over the circumference of the eccentric region. One of the geometries is used for fastening the measurement object, and the other or others serve(s) to keep the center of mass fixed during a rotation of the eccentric. The provision of a plurality of geometries has the further advantage that, when fixing the measurement object, only a partial rotation of the eccentric is required because one of the geometries engages more quickly than when a single geometry is provided. Yet another advantage is that, if one geometry becomes worn, the other geometries can be used.

The eccentric region may be of axially symmetrical design. Here, the plane of symmetry runs through the axis of rotation. It is thus possible, for example, for two geometries which act on the measurement object to be provided. The two geometries are arranged oppositely on the circumferential surface of the eccentric region. While one geometry clamps the measurement object, the other geometry is a "dummy" with regard to the clamping. The other geometry serves the purpose of ensuring that the center of mass lies on the axis of rotation.

The mass density of the eccentric region may vary in the radial direction (20). The external shape of the eccentric region has hitherto been correspondingly designed to keep the center of mass on the axis of rotation. A further option is to vary the mass density.

Both options may be combined with one another. The mass density may for example be adapted in the radial direction such that, in the region situated opposite the geometry which acts on the measurement object, the mass density is increased such that, in this way, the weight of the geometry is compensated and the center of mass lies on the axis of rotation. The mass density of the eccentric region may be varied for example through the use of materials with different densities or through the use of a single material, wherein the region of lower mass densities has cavities. In a simple case, it is sufficient for axially running bores to be formed in the region of the acting geometry in order to shift the center of mass into the axis of rotation.

An actuating region may be arranged on an axial end of the eccentric in order to allow an operator to rotate the eccentric. It is thus possible for measurement objects to be easily clamped and unclamped again.

According to a second aspect of the invention, a measurement device for a turbine or compressor blade comprises a measurement receptacle and a gravity-center-neutral eccentric, as described above, for clamping the turbine or compressor blade into the measurement receptacle. The measurement device likewise has the above-described embodiments and advantages.

BRIEF DESCRIPTION OF THE DRAWINGS

The invention will be described in more detail below on the basis of the drawings.

The drawings serve merely to explain the invention and do not restrict the latter. The drawings and the individual parts are not necessarily to scale. The same reference numerals denote identical or similar parts.

DETAILED DESCRIPTION OF INVENTION

Figure 1:
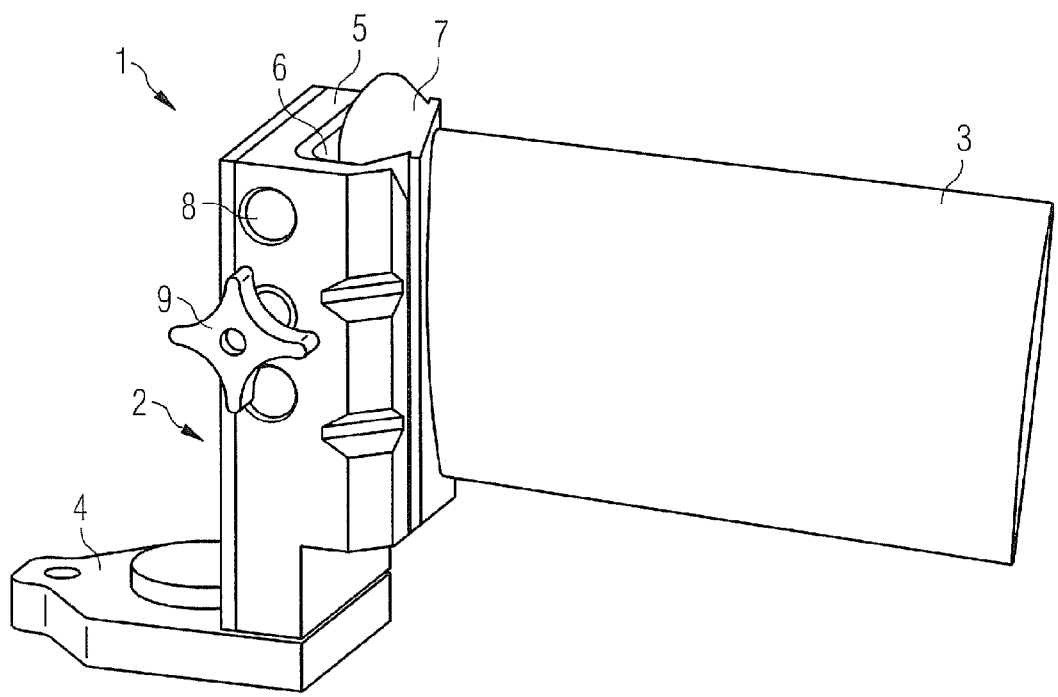
FIG. 1 shows a perspective illustration of a measurement device with gravity-center-neutral eccentric according to the invention.

FIG. 1 shows a measurement device 1 having a measurement receptacle 2 for a measurement object such as for example a turbine blade or a compressor blade 3 (referred to hereinafter as "blade"). The measurement receptacle 2 comprises a base plate 4. The measurement device 1 is fastened by means of the base plate 4 to a moment weighing system (not illustrated) or to an intermediate structure for measuring the blade 3.

A holder 5 is fastened substantially vertically on the base plate 4. Formed in the holder 5 is a receiving opening 6 in which a root 7 of the blade 3 is fastened. The holder 5 and the receiving opening 6 may be formed for example as a groove block. Arranged in the receiving opening 6 is a plurality of slide bearings 8 which facilitate the insertion of the blade 3 into the measurement receptacle 2. By means of an eccentric 9, the root 7 of the blade 3 is clamped in the receiving opening 6, such that the blade 3 is reliably and reproducibly fastened.

Figure 2:
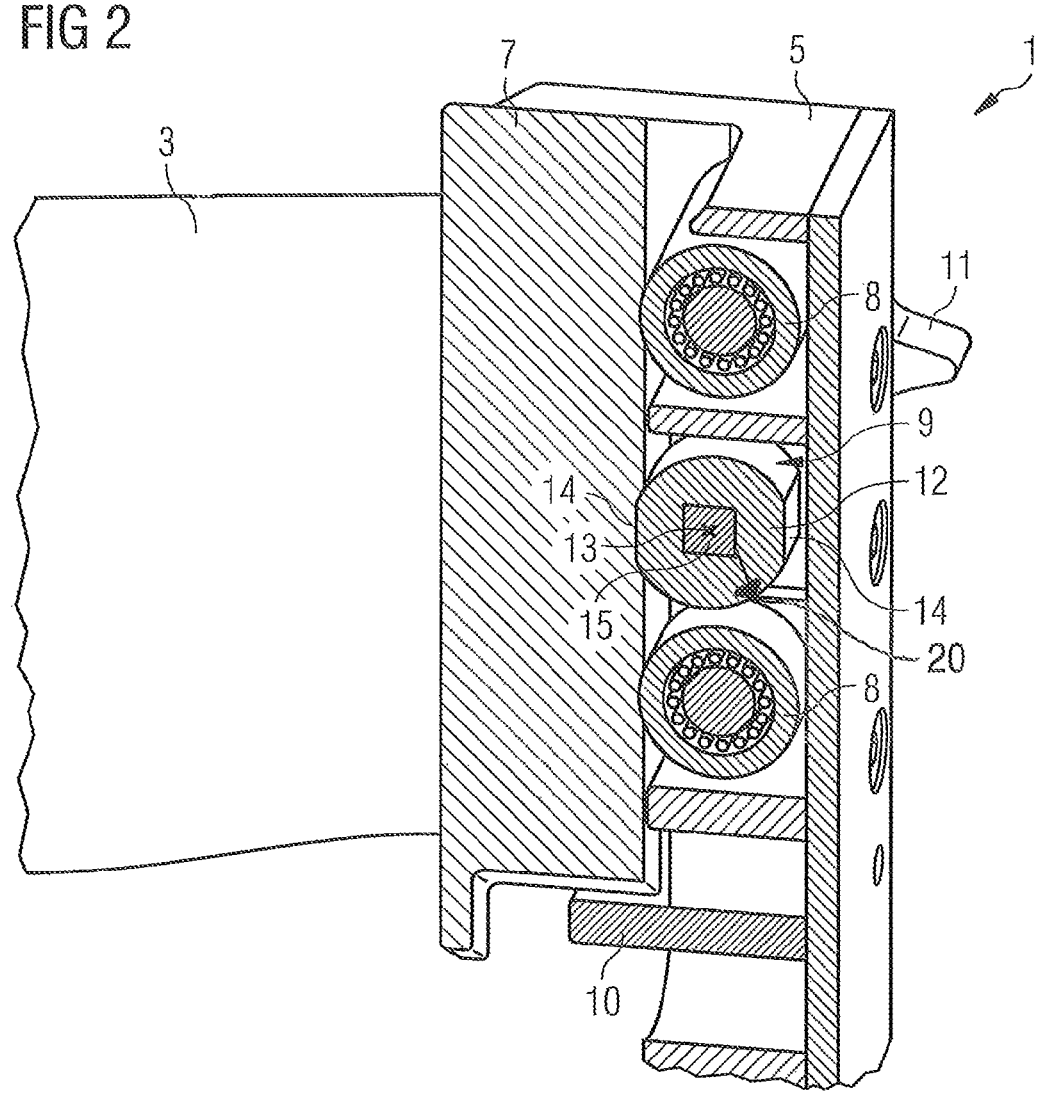
FIG. 2 shows a sectional illustration of the measurement device and of the gravity-center-neutral eccentric according to the invention.

FIG. 2 shows a sectional illustration of the measurement device 1 with the gravity-center-neutral eccentric 9. Two slide bearings 8 are arranged vertically one above the other in the holder 5. A part of the slide bearings 8 projects into the receiving opening 6, specifically in a base region of the U-shaped receiving opening 6. The slide bearings 8 thereby assist the insertion and removal of the blade 3. Further slide bearings 8 may be arranged on the two lateral regions of the receiving opening 6. Arranged in the lower region of the receiving opening 6 is a stop 10 on which a part of the root 7 of the compressor blade 3 is supported.

The gravity-center-neutral eccentric 9 is arranged between the two slide bearings 8 and likewise projects into the receiving opening 6, such that contact with the blade root 7 of the blade 3 occurs. The eccentric 9 comprises an actuating region in the form of a knob or handle 11 for actuation, that is to say rotation, and an eccentric region 12 for clamping the blade 3. Said eccentric region 12 is connected to the handle 11 via a shaft 15 which, in the present exemplary embodiment, is a square shaft connected to the eccentric region 12 by means of positive locking. The eccentric region 12 may extend over the full width of the root 7 or over a part of the width. The eccentric 9 is rotatably mounted, such that it can be rotated by means of the handle 11 about an axis of rotation 13 realized by the longitudinal axis of the shaft 15.

The eccentric region 12 has two geometries 14 which act on the measurement object, in this case in the form of the blade 3, wherein only one of the two geometries can act on the blade root 7 at one time. The two geometries 14 are arranged symmetrically with respect to running axis of rotation 13, such that the center of mass of the eccentric 9 lies on the axis of rotation 13. This provides the gravity-center-neutral eccentric 9 which has the same center of mass in all positions thereof. Therefore, during rotation of the eccentric 9, no changes occur with regard to the center of mass of the measurement device 1, and the measurement of the measurement object is therefore not influenced.

The geometry 14 may, as is shown, be arranged twofold on the circumferential surface of the eccentric region 12. It is also possible for yet more geometries 14 to be provided, for example four geometries 14. It is important that an even number and a symmetrical arrangement of the geometries 14 is provided in order to arrange the center of mass of the eccentric 9 on the axis of rotation 13. The expression "geometry" may also be understood more broadly, such that the geometry encompasses the entire circumferential surface. Aside from the design and/or arrangement of the geometries 14, the mass density of the eccentric region 12 may also be varied in the radial direction. The alignment of the center of mass with the axis of rotation may therefore be realized by means of the geometric design of the eccentric region 12 and/or a variation of the mass density.

The alignment of the center of mass by means of the configuration of the eccentric region 12 has been described. An eccentric region whose center of mass does not lie on the running axis of rotation 13 may also be compensated. The compensation may be realized by means of configuration of shape and material in other axial regions of the eccentric 9, such as for example the handle or the shaft 15.

Figure 3:
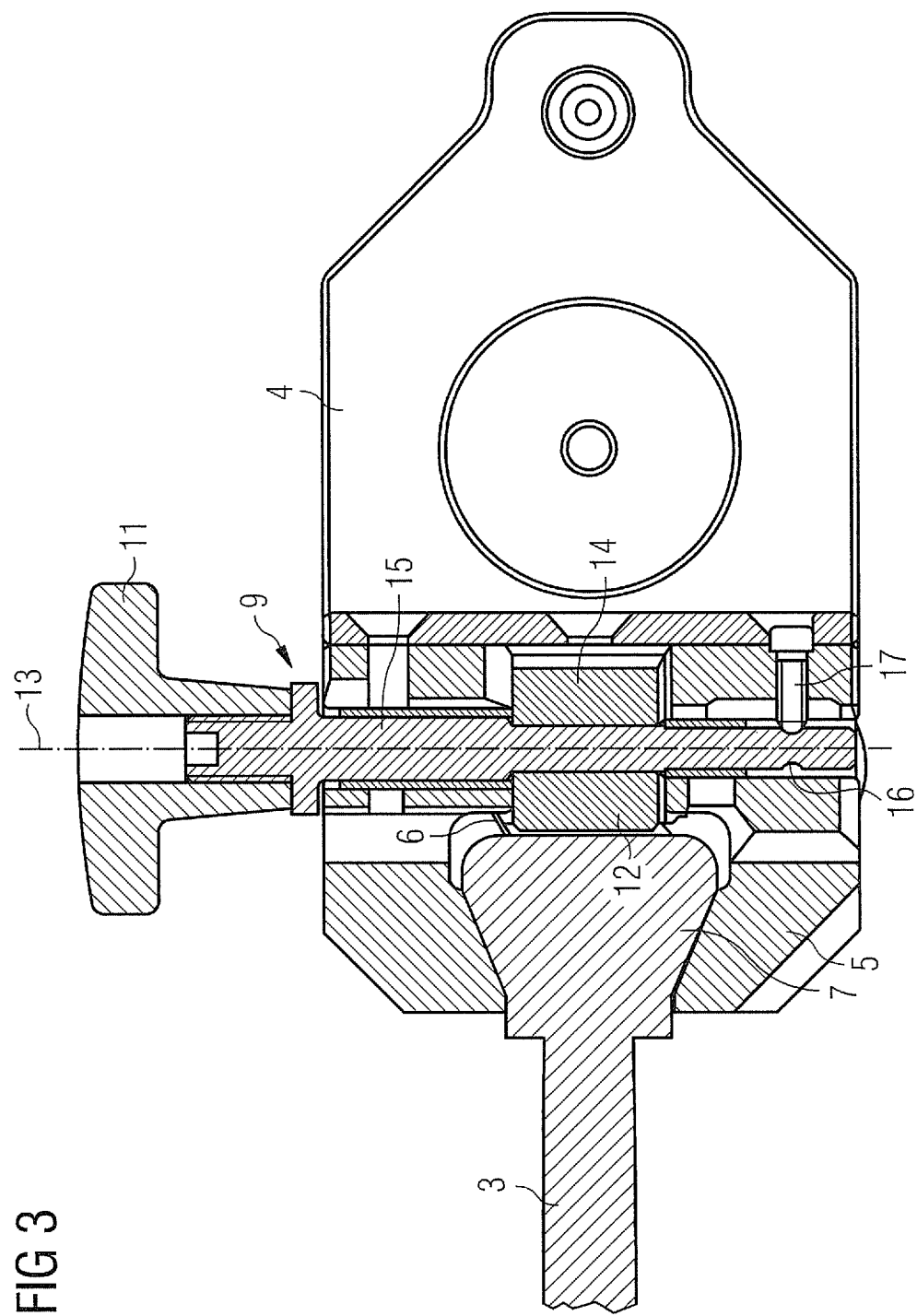
FIG. 3 shows a sectional illustration of the measurement device and of the gravity-center-neutral eccentric in plan view according to the invention.

FIG. 3 shows the measurement device 1 in a sectional illustration in plan view. The base plate 4 may be fastened to a moment weighing system by means of screws, pins, bolts or similar fastening means. The receiving opening 6 formed in the holder 5 is matched in terms of its contour to the blade root 7 of the blade 3 in order to ensure secure fixing of the blades 3. In particular, side regions of the receiving opening 6 taper conically so as to be matched to the blade root 7. The slide bearings (not illustrated in this figure) and the gravity-center-neutral eccentric 9 are arranged in a rear part of the receiving opening 6.

The eccentric 9 is rotatably mounted in the holder 5 and can be rotated about an axis of rotation 13 by means of the handle 11. During the rotation, a geometry 14 of the eccentric region 12 is pressed against the blade root 7, whereby the blade root 7 is pressed against the conically tapering side walls of the receiving opening 6 and the blade 3 is thereby securely and reproducibly fixed in the measurement receptacle 11.

The geometry 14 may be designed such that the blade 3 can be fixed by rotating the eccentric 9 in both directions. The material of the eccentric region 12 or of the geometry 14 may have slight elastic deformability in order to permit better adaptation to the root 7 of the blade 3.

Here, the gravity-center-neutral eccentric 9 comprises a shaft 15, on one end of which the handle 11 is fastened. The handle may also be formed in one piece with the shaft 15. The handle 11 and the shaft 15 are formed so as to be centered on the axis of rotation 13. The eccentric region 12 is arranged in a middle region of the shaft 15. The eccentric region 12 may be attached to the shaft 15, for example pushed onto a square shaft and held by positive locking, or may be formed in one piece with the shaft 15. The eccentric region 12 comprises two geometries 14 which are arranged such that the center of mass of the eccentric region 12 and therefore of the entire eccentric 9 lies on the axis of rotation 13. At a second end, the shaft 15 has an encircling groove 16 into which the tip of a locking screw 17 can engage in order to prevent a displacement of the eccentric 9 in the axial direction. The locking screw 17 is attached in the holder 5.

The measurement device 1 is used as described below. Firstly, the measurement device 1 is fastened to a moment weighing system or similar measurement unit. The blade root 7 of the blade 3 is subsequently inserted into the receiving opening 6 of the measurement receptacle 2 until the blade root 7 comes into contact with the stop 10. Here, the slide bearings 8 assist a frictionless movement of the blade root 7 in the receiving opening 6.

The blade 3 is now clamped by means of the gravity-center-neutral eccentric 9. For this purpose, the eccentric 9 is rotated about the axis of rotation 13 using the handle 11, wherein a geometry 14 of the eccentric region 12 comes into contact with the blade root 7. On account of the eccentric configuration of the eccentric region 12, a force is exerted on the blade root 7 by further rotation. Said force presses the blade root 7 against the conically tapering side regions of the receiving opening 6, such that the blade root 7 and therefore the blade 3 is securely and reproducibly held in the measurement receptacle 2. The displacement of the eccentric 19 in the axial direction is prevented by means of the locking screw 17.

After measurement has taken place, the eccentric 9 is released by rotation in the opposite direction. The blade 3 is subsequently removed from the receiving opening 6.

The invention claimed is:

1. A measurement device for a turbine or compressor blade, comprising:
   a measurement receptacle; and
   a gravity-center-neutral eccentric, comprising:
      an axis of rotation, and
      an eccentric region,
      wherein a first center of mass of the gravity-center-neutral eccentric lies on the axis of rotation,
      wherein the gravity-center-neutral eccentric is used for clamping the turbine or compressor blade in the measurement receptacle,
      wherein the eccentric region is of axially symmetrical design,
   wherein a variation of mass density of the eccentric region in a radial direction is realized using materials of different densities,
   wherein a second center of mass of the eccentric region lies outside the axis of rotation and compensation takes place in another axial region of the eccentric.

2. The measurement device as claimed in claim 1, wherein a second center of mass of the eccentric region lies on the axis of rotation.

3. The measurement device as claimed in claim 1, wherein the eccentric region is point-symmetrical with respect to the axis of rotation.

4. The measurement device as claimed in claim 1, wherein a mass density of the eccentric region varies in a radial direction.

5. The measurement device as claimed in claim 1, wherein an actuating region is arranged on one axial end of the eccentric.

6. A measurement device for a turbine or compressor blade, comprising:
   a measurement receptacle; and
   a gravity-center-neutral eccentric, comprising:
      an axis of rotation, and
      an eccentric region,
      wherein a first center of mass of the gravity-center-neutral eccentric lies on the axis of rotation,
      wherein the gravity-center-neutral eccentric is used for clamping the turbine or compressor blade in the measurement receptacle,
      wherein the eccentric region is of axially symmetrical design,
   wherein a variation of mass density of the eccentric region in a radial direction is realized using materials of different densities,
   wherein a second center of mass of the eccentric region lies outside the axis of rotation and compensation takes place in another axial region of the eccentric, and
   wherein a variation of the mass density of the eccentric region in a radial direction is realized using a single material.

* * * * *